United States Patent Office 3,419,510
Patented Dec. 31, 1968

3,419,510
CARBOXYL-TERMINATED URETHANE-CONTAINING POLYESTERS AND COATING COMPOSITION DERIVED THEREFROM
Stephen F. Hudak, Minneapolis, Minn., assignor to Ashland Oil & Refining Company, Ashland, Ky., a corporation of Kentucky
No Drawing. Filed Nov. 14, 1966, Ser. No. 593,750
10 Claims. (Cl. 260—18)

ABSTRACT OF THE DISCLOSURE

Carboxyl terminated polyesters useful in preparation of coatings based upon epoxidized fatty esters are prepared by reacting a polyisocyanate with an excess of polyol to form a hydroxy terminated prepolymer which is then reacted with excess polycarboxylic acid yielding a product with an acid value of at least 50. Solvent based admixtures of this product with epoxidized oils yield coating compositions having improved potlife.

---

The present invention relates to polyesters containing urethane linkages and free carboxyl groups. One aspect of this invention relates to a multiple package coating vehicle containing, in a first package, an epoxy component and, in a second package, a co-reactant for such epoxy component, comprising the carboxyl-terminated urethane-containing polyester of the present invention. When mixed together and properly applied to a suitable surface, the contents of these two packages react together to form a hard, dry, tack-free, flexible, mar-resistant coating.

Often it is desirable to use reactive components to form coating vehicles. However, some combinations of reactive components are so reactive that it is not possible, in a practical sense, to premix them in a single container which can be stored, sold, and shipped in commerce as such and still obtain the same desirable film properties. Instead, when these reactive components are mixed together in a single container, the components begin to react with each other, thereby causing the viscosity of the mixture to increase. Frequently, the viscosity will increase so substantially in a matter of hours that the mixture becomes unuseable.

As a consequence, those skilled in the coating art have become increasingly aware of the advantageous film properties which can be obtained by the use of two-package coating vehicles. Such coating vehicles, and particularly paints prepared from such vehicles, are stored, sold, and shipped in separate, complementary packages. The contents of the two packages are then mixed together at the time of use and the resulting mixture then applied to the surface in the usual fashion. In U.S. Patent 3,218,274 which is incorporated herein by reference, there is described and claimed such a two-package coating system. One of the two packages described in said patent contains an epoxidized fatty compound such as epoxidized soybean oil. The other package contains an acidic polyester which is used as a curing agent or co-reactant for the epoxidized fatty compound of the first package. At the time of use, the contents of the two packages are mixed together and the resulting mixture spread in film form on a suitable substrate, e.g. wood, and cured such as by baking or air-drying at room temperature, to thereby provide a decorative and/or protective coating.

One significant advantage of a preferred embodiment of that two-package coating system is its ability to form thin, supported films which cure at room temperature to form hard, tack-free, mar-resistant, durable coatings. Cured coatings on wood or metal, for example, prepared from this two-package coating system exhibit highly desirable properties in terms of (1) their non-yellowing tendency, (2) their ability to retain their original hard gloss for years without fading (although they can be made with a low gloss), (3) their durability, (4) their ability to be applied by brushing, spraying or rolling on common substrates such as wood, concrete and metal, and (5) the ease with which dirt and common stains can be removed. On concrete or earthenware, this coating system provides a glazed, ceramic-like appearance.

The acidic polyester curing agents described in said patent are, in general, esterification products of polyols with an excess of a polycarboxylic acid or anhydride. Although such acidic polyesters, when reacted with the described epoxy component, give rise to cured coatings of excellent properties, there are certain applications for the coating in which an improvement in the air-dry time of the coating and also in the shelf life of the two-package blend would constitute a significant improvement in the utility of the coating composition.

It has now been discovered that improved coatings can be obtained by employing the novel carboxyl-terminated urethane-containing polyesters of the present invention. It has further been discovered that the use of the novel carboxyl-terminated urethane-containing polyesters, in combination with epoxy compounds, does not deleteriously affect the other outstanding properties of the coating compositions derivable from the combination of acidic polyester curing agents and epoxy components described in said patent.

It is therefore an object of the present invention to provide novel carboxyl-terminated urethane-containing polyesters.

It is another object of the present invention to provide coating compositions employing the novel carboxyl-terminated urethane-containing polyesters of the present invention.

It is still another object of the present invention to provide a process for preparing the novel carboxyl-terminated urethane-containing polyesters of the present invention and for using such in coating compositions.

Further objects of the present invention will become apparent from the following description and claims.

*The carboxyl-terminated urethane-containing polyester*

The novel carboxyl-terminated urethane-containing polyesters of the present invention are obtained by (1) reacting under urethane-forming conditions a polyisocyanate containing two or more isocyanate (—NCO) groups per moleucule with an excess of polyol containing on the average more than two and preferably from 2.2 to 4.0 hydroxyl (—OH) groups per molucule, the overall ratio of —OH groups to —NCO groups in the reaction components being from 1.2 to 3 and preferably from 1.5 to 2.2; (2) continuing the reaction until substantially all of the isocyanate groups have reacted with the polyol and a hydroxyl-terminated polyurethane is obtained; (3) reacting under ester-forming conditions the hydroxyl-terminated polyurethane with a polycarboxylic acid to form the carboxyl-terminated urethane-containing polyester by employing an excess of the polycarboxylic acid such that the overall ratio of carboxylic acid groups to hydroxyl groups in the reaction components is from 1.2 to 3.0 and preferably from 1.5 to 2.2, and even more preferably about 1.8; and (4) continuing the reaction until substantially all of the hydroxyl groups have reacted, and recovering a carboxyl-terminated urethane-containing polyester having an acid value of at least 50. The term "polycarboxylic acid" as employed herein is intended to include polycarboxylic acid anhydrides in which each anhydride group corresponds in its reactivity with the hydroxyl-terminated polyurethane to two carboxylic acid groups.

The reaction of the polyisocyanate with the polyol is conducted by methods heretofore established for the reaction of such materials to form urethane groups. In general, the polyisocyanate is gradually added to the polyol at temperatures from about 25°–100° C. over a period of time of from about 5 minutes to about 8 hours. Lower or higher temperatures can be employed, depending on the reactivity of the polyisocyanate. In general, aliphatic polyisocyanates require somewhat higher temperatures than aromatic polyisocyanates. It will be apparent that higher temperatures will result in shorter reaction times and, vice versa, that lower temperatures will require longer reaction times for the substantially complete reaction of the isocyanate groups with the hydroxyl groups. The reaction is generally continued until substantially all of the isocyanate groups have reacted. The reaction is furthermore preferably conducted in the presence of a solvent capable of dissolving the reagents as well as the resulting hydroxyl-terminated polyurethane. Solvents suitable for this purpose are known in the art and include, in general, liquids which are inert towards the isocyanate group, such as lower dialkyl ketones (e.g. methyl isobutyl ketone), lower alkyl esters (e.g. ethyl acetate), aromatic hydrocarbons (e.g. toluene and xylene), aliphatic hydrocarbons (e.g. hexane), chlorinated hydrocarbons (e.g. trichloro- or tetrachloroethylene), and cyclic ethers (e.g. tetrahydrofuran). It is to be recognized, however, that the preparation of hydroxyl-terminated polyurethane is not limited to the described methods, and, as a matter of fact, other procedures may be preferred in certain circumstances. Thus, it may be preferred to prepare an isocyanate-terminated polyurethane employing one polyol and thereafter to modify the resulting isocyanate-terminated polyurethane with a different polyol to obtain the desired hydroxyl-terminated polyurethane. The various techniques of preparing the hydroxyl-terminated polyurethane are known in the art and thus not deemed to require specific discussion. Depending on the solvent employed, the resulting polyurethane can be employed in the further reaction with the polycarboxylic acid without separation, or can be isolated by distilling off the particular solvent used.

The esterification of the hydroxyl-terminated polyurethane with the dicarboxylic acid is similarly conducted under conditions heretofore established for the esterification of polyhydroxyl compounds with acids or acid anhydrides. Generally, the esterification is conducted at temperatures of 275°–450° F. and more preferably at 290°–375° F. Acidic or basic catalysts can be employed to accelerate the esterification, although such is not essential. Again, the reaction is preferably conducted in the presence of a solvent. Suitable solvents are, in particular, aliphatic hydrocarbons, aromatic hydrocarbons, and chlorinated hydrocarbons, such as can also be employed in the formation of the hydroxyl-terminated polyurethane. The esterification reaction is continued until most or all of the available hydroxyl groups have been esterified. Thus, the reaction is continued until the esterification reaction product, i.e. the carboxyl-terminated urethane-containing polyester has an acid value of at least 50 and preferably of at least 80. Acid values over 100 are especially desirable.

Any aromatic or aliphatic polyisocyanate can be employed in the formation of the novel carboxyl-terminated urethane-containing polyesters of the present invention. Diisocyanates, however, are preferred and in particular aliphatic diisocyanates are the most preferred reagents. The term "aliphatic diisocyanate" as employed herein is intended to include all diisocyanates which are free from aromatic rings and thus includes not only aliphatic diisocyanates in which the isocyanate-free residue is an aliphatic hydrocarbon radiacl, but also such aromatic ring-free radicals which contain functional moieties of the ester, ether, or ketone type. Suitable aliphatic polyisocyanates include hexamethylene diisocyanate; 4,4'-dicyclohexylmethane diisocyanate; bis(2-isocyanatoethyl) carbonate; bis(2 - isocyanatoethyl) - 4 - cyclohexene-1,2-dicarboxylate; bis(2 - isocyanatoethyl)fumarate; 1,4-tetramethylene diisocyanate, and 1,10 - decamethylene diisocyanate. Suitable aromatic polyisocyanates include toluene-2,4-diisocyanate; 1,5-naphthalene diisocyanate; 4-methoxy-1,3-phenylene diisocyanate; 4-chloro-1,3-phenylene diisocyanate; 2,4'-diisocyanatodiphenylether; 5,6-dimethyl-1,3-phenylene diisocyanate; 2,4-dimethyl-1,3-phenylene diisocyanate; 4,4'-diisocyanatodiphenylether; benzidine diisocyanate; 4,4'-diisocyanatodibenzyl; methylene-bis(4-phenylisocyanate); 2,4,6-toluene triisocyanate; and 1,3-phenylene diisocyanate.

The polyols employed can be any of the polyols employed heretofore in the formation of polyurethanes. Such polyols include polyether polyols, polyester polyols, and aliphatic polyols which are defined herein to include, in addition to the aliphatic hydrocarbon hydroxyl-free residue, also nonpolymeric ether groups. In view of the principal utility of the carboxyl-terminated urethane-containing polyesters of the present invention as co-reactants for the epoxy components in coating compositions, it is preferred that the polyols employed in the present invention have molecular weights below 1,000 and more preferably below 500, since higher molecular weight polyols result in carboxyl-terminated urethane-containing polyesters which react sluggishly with the epoxy component of the coating composition. Particularly preferred are, therefore, the aliphatic polyols as defined hereinabove and low molecular weight polymeric polyols, particularly polyether polyols. As indicated above, the average number of hydroxyl groups per molecule should be in excess of 2 and preferably in the range of 2.2 to 4.0. Hence, although diols can be employed as the polyol reagent for the polyisocyanate, such diols must be admixed with at least some polyols containing three or more hydroxyl groups per molecule. Suitable polyols, therefore, include ethylene glycol; propylene glycol; trimethylene glycol; 1,2-butylene glycol; 1,5-pentane diol; 1,2-cyclohexane diol; glycerol; trimethylol pentane; trimethylol propane; polypropylene triols; polypropylene tetrols; sorbitol; pentaerythritol; dipentaerythritol; 1,2,6-hexane triol; and 2,2,6,6-tetrakis (hydroxymethyl)cyclohexanol. Alkylene oxide-modified polyols which, as indicated above, are included within the definition of aliphatic polyols include such compounds as 1-(2 - hydroxyethoxy)-2-butanol; 3-(2-hydroxypropoxy)-1,2-hexane diol. Polyether polyols suitable as co-reactants for the polyisocyanates within the scope of the present invention include, in particular, polyalkylene ether glycols having the general formula HO(RO)$_n$H wherein R is an alkylene radical of preferably 2–4 carbon atoms and $n$ is an integer of 2–20. Representative glycols of this type include polyethylene ether glycol; polypropylene ether glycol; polytrimethylene ether glycol; polytetramethylene ether glycol; and poly-1,2-dimethylethylene ether glycol. Polyether glycols are further obtained by the reaction of an alkylene oxide such as ethylene oxide; propylene oxide; 1,2-epoxybutane; and mixtures thereof, with any of the above-specified aliphatic polyols but in particular with such polyols as contain three or more hydroxyl groups, such as glycerol; 1,2,6-hexanetriol; trimethylolpropane; pentaerythritol, and 2,2,6,6-tetrakis(hydroxymethyl)cyclohexanol.

It is to be understood that the hydroxyl-terminated polyurethanes can also be formed employing mixtures of isocyanates or mixtures of polyols.

The polycarboxylic acid employed in the esterification with the hydroxyl-terminated polyurethane can be aliphatic or aromatic in nature and can be saturated or ethylenically unsaturated. In addition to hydrocarbon polycarboxylic acids, halogenated polycarboxylic acids can also be employed. The preferred carboxyl-terminated urethane-containing polyesters are, in fact, prepared from the hydroxyl-terminated polyurethane by reaction with polycarboxylic acid in which at least part of the polycarboxylic acid is a chlorinated polycarboxylic acid. The polycarboxylic acid component contains preferably at least 5 mole percent and more preferably from 25 to 75 mole percent of the chlorinated acid. Suitable non-chlorinated polycarboxylic acids include succinic acid, maleic acid, fumaric acid, glutaric acid, adipic acid, pimelic acid, sebacic acid, fatty dimer acid, 1,4-cyclohexane dicarboxylic acid, tetrahydrophthalic acid, hexahydrophthalic acid, terephthalic acid, phthalic anhydride, and the like. If desired, mixtures of non-chlorinated polycarboxylic acids can be used. Where they exist, the corresponding anhydrides can be used. Phthalic anhydride is the preferred non-chlorinated polycarboxylic acid.

Suitable chlorinated polycarboxylic acids are dichloromaleic acid, hexachlorophthalic acid, tetrachlorophthalic acid, monochlorophthalic acid, hexachlorendomethylene tetrahydrophthalic acid, and the like. Mixtures of chlorinated polycarboxylic acids can be used. Where they exist, the corresponding anhydrides can be used. Hexachloroendomethylene tetrahydrophthalic acid (i.e. chlorendic acid) and its anhydride are the preferred chlorinated polycarboxylic acids.

As will be apparent from the discussion of the utility of the carboxyl-terminated urethane-containing polyesters of the present invention in the formation of coating compositions in combination with an epoxy component, the polyesters are employed in general as solutions in inert organic solvents which are removed from the applied coating during the curing of the coating. In some applications it is, however, desirable to eliminate the necessity of such solvent removal. In a particular embodiment of the present invention, the novel polyesters are prepared in such manner as to avoid the necessity of a solvent. Instead of employing a solvent, the polyesters are dissolved in a liquid vinyl monomer readily polymerizable once initiated by the addition of a free radical generating initiator. Thus, the novel polyesters can be dissolved in such commonly employed liquid vinyl monomers as the vinyl aromatic monomers (e.g. styrene, α-methyl styrene, α-chloro styrene, and vinyl toluene); the acrylic monomers (e.g. acrylates and methacrylates of $C_1$–$C_8$ aliphatic alcohols, or acrylonitrile); the vinyl ester monomers (e.g. vinyl acetate, vinyl propionate); or vinyl halides (e.g. vinyl chloride, vinylidene chloride). In order for these monomers to be employed in this application, it is essential that they be able to react with the polyester and thus be capable of existing in the resulting composition in a chemically bonded form. In order to achieve reactivity of such vinyl monomers with the coating composition, it is generally desirable to modify the polyester of the present invention to include ethylenic unsaturation capable of copolymerizing with the vinyl monomers employed. This unsaturation in the polyester can be accomplished by employing an ethylenically unsaturated isocyanate such as, for example, a bis(2-isocyanatoethyl)-4-cyclohexene-1,2-dicarboxylate, illustrated hereinabove, or by employing an ethylenically unsaturated polyol such as 2-butene-1,4-diol; 3-cyclohexene-1,1-dimethanol; monoallyl ethers of trimethylolpropane; monoallyl ethers of ethylene glycol; monoallyl ethers of pentaerythritol; monoallyl ethers of sorbitol; the monoallyl ether of glycerol; diallyl ether of pentaerythritol; or the triallyl ether of manitol; but preferably such ethylenic unsaturation is introduced by employing an ethylenically unsaturated polycarboxylic acid such as maleic anhydride, itaconic acid, citraconic acid, fumaric acid, and the like. Another means of introducing the necessary ethylenic unsaturation to cause interpolymerization between the polymerizable diluent and the polyester when such are combined with the epoxy component in the coating composition comprises reacting one of the hydroxyl groups of the hydroxyl-terminated polyurethane with an ethylenically unsaturated fatty acid of 12–26 carbon atoms (e.g. linoleic acid), prior to or simultaneously with the reaction of the hydroxyl-terminated polyurethane with the polycarboxylic acid. The esterification of some of such hydroxyl groups with monocarboxylic acids should, of course, be taken into consideration when calculating the reaction ratios of hydroxyl-terminated polyurethane and polycarboxylic acids so that the desired acid number of the resulting esterification product is maintained.

On mixing the epoxy component of the coating composition with the vinyl monomer-modified carboxyl-terminated urethane-containing polyester, it is generally desirable to add an initiator to the system. Peroxides such as cumene peroxide, benzoyl peroxide, or di-t-butyl peroxide, or azo-bis-nitriles such as azo-bis-i-butyronitrile, can be employed. Other free radical generating initiators acting similarly are known to those skilled in the art.

Use of the carboxyl-terminated urethane-containing polyester

The carboxyl-terminated urethane-containing polyesters are used as co-reactants for various epoxy components. For most coating applications, from 50–250 parts by weight of the novel polyester will be used per 100 parts by weight of epoxy component. Optimum results usually occur when from 100–150 parts by weight of modified polyester are employed per 100 parts by weight of epoxy component. One or both components can be diluted with inert solvents, such as described in U.S. 3,218,274.

The novel polyesters of the present invention can be employed alone or in combination with other acidic polyesters such as described in U.S. 3,218,274 as the co-reactant for the epoxy component. Such mixtures can be obtained by admixing the preformed acidic polyesters or by admixing polyols, for example, with the hydroxyl-terminated polyurethanes and reacting the resulting mixture with the polycarboxylic acid. In the latter case, it will be apparent that additional acid is required to maintain the necessary acid-to-hydroxyl ratios.

If desired, various pigments, fillers, extenders, dyes, dryers, stabilizers, and the like, can be added to the epoxy component, to the polyester component, or to the resulting mixture, to thereby form, for example, a paint. The resulting mixture can be applied to a suitable surface, e.g. applied to wood by brushing to thereby form a thin, wet film. These wet films then cure to a tack-free state. Curing can take place at room temperature or can be accelerated by baking. Partial pre-reaction of the epoxy and polyester components, as well as catalysts, can be used to speed the curing or drying time. However, it should be noted that the coating vehicles of the present invention can co-react and cure in the absence of any additional or supplemental co-reactants, curing agents, or catalysts. Although supplemental curing agents or catalysts (e.g. various organometallic catalysts) for the epoxy component can be added to the two-package coating vehicle of the present invention, the preferred epoxy/polyester coating vehicle of the present invention is capable of curing in thin films (e.g. .003 wet films) to a tack-free state at room temperature in the absence of any additional curing agents or catalysts.

The epoxy component can be an epoxidized fatty compound (e.g. epoxidized linseed oil), the reaction product of a dihydric phenol and epichlorohydrin (e.g. bisphenol and epichlorohydrin), a cyclic diepoxide, or a glycidyl ester or ether. Because of differences in performance (e.g. as reflected by speed of drying, hardness, flexibility, tendency to yellow, and the like), we prefer to employ an epoxidized fatty compound (or a mixture thereof) as the predominant (i.e. more than 50 weight percent of the epoxy component), or only epoxy component. Suitable epoxidized fatty compounds are the epoxidized fatty oils (e.g. epoxidized soybean oil); epoxidized fatty acid esters of monohydric alcohols (e.g. epoxidized methyl oleate); epoxidized fatty acid esters of polyhydric alcohols (e.g. epoxidized tetra-tall oil ester of pentaerythritol); epoxidized fatty nitriles (e.g. epoxidized oleyl nitrile); epoxidized fatty amides; epoxidized fatty amines; and epoxidized fatty alcohols. Such epoxidized fatty compounds are already well-known in the art. Typically, these epoxidized fatty compounds will have 8–26 carbon atoms (e.g. 12–22 carbon atoms) in each of the fatty radicals and have an internal oxirane value of from 4% to 10%. It is preferred that the oxirane value of the epoxidized fatty compounds be at least 5.5%. Particularly preferred for use as the epoxy component in the two-package coating composition of this invention are the curable epoxidized esters of fatty acids. These epoxidized esters, having internal oxirane, will generally contain from 1–10 carbon atoms in the mono- or polyhydric alcohol portion. Illustrative epoxidized fatty acid esters are epoxidized soybean oil; epoxidized linseed oil; epoxidized safflower oil; epoxidized 2-ethylhexyl tallate; epoxidized 1,5-pentanediol dioleate; epoxidized 1,2,6-hexanetriol dioleate monoacetate; epoxidized methyl oleate; epoxidized glycerol mono-oleate; epoxidized glycerol mono-linoleate; epoxidized glycerol monostearate dilinoleate; epoxidized glycerol trilinoleate; epoxidized glycerol trioleate; and the epoxidized full esters of mono-, di-, or polypentaerythritol with soy, tall, or linseed fatty acids. Mixtures of these esters can be used.

Epoxidized compounds of different types and oxirane values can be blended together to obtain various properties, e.g. improved resistance to yellowing, improved drying speed, and the like. When a mixture of epoxidized fatty compounds is used, it is preferred that the mixture have an average internal oxirane value of at least 5.5%.

The present invention is further illustrated by the following examples in which, unless otherwise indicated, all parts and percentages are by weight.

EXAMPLE 1

Into a reaction flask equipped with a stirrer, thermometer, nitrogen inlet tube, and addition funnel, is charged one mole of trimethylol propane and two moles of 1,3-butanediol diluted to 50% by weight of the mixture with Cellosolve acetate. To the polyol solution maintained under a blanket of nitrogen and heated to about 120° F. is then added, dropwise, two moles of toluene-2,4-diisocyanate. The reaction mixture is gradually heated to achieve a temperature of 200° F.–212° F. as the last of the diisocyanate is added to the reaction mixture. The reaction mixture is then held at that temperature for an additional two hours to insure complete reaction of the isocyanate.

The resulting hydroxyl-terminated polyurethane solution is then esterified by adding one mole of phthalic anhydride, two moles of chlorendic acid, and 344 g. of xylene, and the mixture is heated to 290°–310° F., removing water azeotropically. The reaction is continued at that temperature until the reaction is complete, as evidenced by recovery of the theoretical amount of water (about 54 cc., calculated on the assumed conversion of all the hydroxyl groups to ester linkages by the acid). The resulting polyester solution is cooled to room temperature and 370 cc. of xylene is added until the nonvolatile solids content (NV) is 60%. The resulting carboxyl-terminated urethane-containing polyester solution has a viscosity of about 8.6 stokes, and an acid value of 63.2 (corrected to 100% NV).

EXAMPLE 2

A solution of 127.1 g. of bis(2-isocyanatoethyl)fumarate in 54.5 g. of ethyl acetate under nitrogen is prepared. This solution is then heated to 160° F. and added, dropwise, to a solution of 134 g. of trimethylol propane dissolved in 57.5 g. of ethyl acetate heated to a temperature of 190° F. During the addition, the reaction temperature is maintained at reflux at approximately 190° F. Reaction at reflux is continued for an additional 4 hours to assure complete reaction. The ethyl acetate is then distilled out and 80 g. of ethyl acetate is recovered.

To the resulting hydroxyl-terminated polyurethane is then added, in the order listed and at a temperature of 250° F., 494.5 g. of xylene, 296 g. of phthalic anhydride, 776 g. of chlorendic acid, and 85.5 g. of technical grade pentaerythritol. The reaction mixture is heated to 275°–290° F. under reflux until 43 cc. of water is removed. The resulting reaction mixture is cooled and diluted with 390 g. of Cellosolve acetate to give a carboxyl-terminated urethane-containing polyester solution having a NV of 60%, a viscosity of about 4.9 stokes, and an acid value of 130 (100% solids).

EXAMPLE 3

To a 3-liter flask under nitrogen is charged 348 g. of "Hylene" TM, a commercially available toluene-2,4-diisocyanate. To the mixture is then added, dropwise, 62.0 g. of ethylene glycol, the temperature being maintained below 105° F. during the exothermic addition. The reaction is maintained at 90°–100° F. for an additional hour and 175 ml. of methyl isobutyl ketone is added to the resulting isocyanate-terminated polyurethane.

A solution of 268 g. of trimethylol propane is 115 g. of methyl isobutyl ketone is prepared and heated to 190° F. The isocyanate-terminated polyurethane solution warmed to 100° F. is then added, dropwise, to the polyol solution at a temperature of 190°–200° F. over a period of about one hour. The dropping funnel is rinsed with 40 g. of methyl isobutyl ketone. The reaction mixture is then maintained for an additional two hours at 210°–240° F. To the mixture is then added 776 g. of chlorendic acid, 296 g. of phthalic anhydride and 422 g. of xylene. The reaction mixture is then refluxed at 266°–278° F. for a period of about 5 hours, during which time 52 cc. of water is distilled out. The resulting carboxyl-terminated urethane-containing polyester is diluted with 200 g. of xylene and 200 g. of methyl isobutyl ketone to a 60% NV content. The polyester solution has a viscosity of about 15.5 stokes and an acid value of 85 (100% solids).

EXAMPLE 4

To a 3-liter flask equipped with stirrer, thermometer, nitrogen inlet tube, addition funnel, condenser and water trap, is charged 134 g. (1 mole) of trimethylol propane in 57.5 g. (0.05 mole) of methyl isobutyl ketone. The mixture is heated to 180° F. and 100.1 g. of bis(2-isocyanatoethyl)carbonate is added over a period of 30 minutes. The reaction mixture is allowed to exotherm to 200°–210° F. where it is maintained for an additional four hours after the addition.

To the resulting hydroxyl-terminated polyurethane is added 520 g. of xylene, 296 g. of phthalic anhydride, 776 g. of chlorendic acid, and 83.5 g. of technical grade pentaerythritol. The reaction mixture is heated to 270°–290° F. until 42 cc. of water is removed (about 3 hours). The resulting reaction mixture is cooled and diluted with 160 g. of xylene and 170 g. of methyl isobutyl ketone to give a carboxyl-terminated urethane-containing polyester solution having a NV of 60%, a viscosity of about 5.5 stokes, and an acid value of about 143 (100% solids).

EXAMPLE 5

The procedure of Example 4 is repeated employing 154.1 g. of bis(2-isocyanatoethyl) - 4 - cyclohexene-1,2-dicarboxylate instead of the carbonate of Example 4. A carboxyl-terminated urethane-containing polyester having a NV of 60%, a viscosity of Q½ (Gardner-Holdt scale), and an acid value of 137 (100% solids) is obtained.

EXAMPLE 6

The procedure of Example 4 is repeated employing 131.2 g. of 4,4 - methylene-bis(cyclohexylisocyanate) in 43.8 g. of xylene instead of the carbonate of Example 4. A carboxyl-terminated urethane-containing polyester having a NV of 60%, a viscosity of Y (Gardner-Holdt scale), and an acid value of 142 (100% solids) is obtained.

EXAMPLE 7

Following the procedure of Example 4, 67.0 g. of 1,2,6-hexanetriol in 382 g. of xylene is reacted with 43.5 g. of toluene-2,4-diisocyanate and held two hours after the last drop of toluene-2,4-diisocyanate enters the reaction mix. The resulting hydroxyl-terminated polyurethane, which at this time is partially insoluble in the xylene, is then reacted with 776 g. of chlorendic acid and 41.2 g. of technical grade pentaerythritol. The reaction is continued until 41 cc. of water is distilled out. A xylol soluble, carboxyl-terminated urethane-containing polyester is obtained which, on addition of 210 g. of xylene, has a NV of 60%, a viscosity of Y¾ (Gardner-Holdt scale), and an acid value of 94 (100% solids).

EXAMPLE 8

Following the procedure of Example 4, 134 g. of trimethylol propane in 412.5 g. of methyl isobutyl ketone is reacted with a mixture of 43.5 g. of toluene-2,4-diisocyanate and 50 g. of bis(2-isocyanatoethyl)carbonate. The reaction is held for 2–3 hours at 190°–200° F. after the diisocyanates have entered the reaction mix. The resulting hydroxyl-terminated polyurethane, which is partially insoluble in the solvent, is then reacted with 776 g. of chlorendic acid until 38 cc. of water is removed. A clear, carboxyl-terminated urethane-containing polyester solution having a NV of 70%, a viscosity of Z1¼ (Gardner-Holdt scale), and an acid value of 92 (100% solids) is obtained.

EXAMPLE 9

Following the procedure of Example 4, 350 g. of "Niax LHT–240," a commercially available polyether triol derived from 1,2,6-hexanetriol and glycerol (MW ~ 700) in 151 g. of methyl isobutyl ketone is reacted with 53.5 g. of toluene-2,4-diisocyanate. The resulting hydroxyl-terminated polyurethane is then reacted with 776 g. of chlorendic acid and 41.7 g. of pentaerythritol in 352 g. of xylene. A carboxyl-terminated urethane-containing polyester having a NV of 70%, a viscosity of U¾ (Gardner-Holdt scale), and an acid number of 87.3 (100% solids) is obtained.

EXAMPLE 10

Following the procedure of Example 4, 127.5 g. of "Dow Triol CP–260," a propylene triol (MW 255), in 406 g. of xylene is reacted with 43.5 g. of toluene-2,4-diisocyanate. The resulting hydroxyl-terminated polyurethane is then reacted with 776 g. of chlorendic acid and 41.2 g. of pentaerythritol. On distillation of 38 cc. of water and addition of 210 g. of xylene, a carboxyl-terminated urethane-containing polyester is obtained having a NV of 70%, a viscosity of about 9.0 stokes, and an acid value of 100 (100% solids).

EXAMPLE 11

Following the procedure of Example 4, a mixture of 67 g. of trimethylol propane and 67 g. of 1,2,6-hexanetriol is reacted with a mixture of 50 g. of bis(2-isocyanatoethyl)carbonate and 43.5 g. of toluene-2,4-diisocyanate. 0.05 grams of dibutyl tin dilaurate is added after the last drop of diisocyanate solution has entered the reaction mix. The reaction is held for 30 minutes at 190°–200° F. 200 grams of xylene and 100 g. of methyl isobutyl ketone are added and the reaction held at 190°–200° F. for one hour. The resulting hydroxyl-terminated polyurethane is then reacted with 776 g. of chlorendic acid in 113 g. of xylene. On distillation of 40 cc. of water and addition of 230 g. of xylene, a carboxyl-terminated urethane-containing polyester is obtained having a NV of 60%, a viscosity of about 2.5 stokes, and an acid value of 90.0 (100% solids).

EXAMPLE 12

Following the procedure of Example 4, a mixture of 67 g. of trimethylol propane, 127.5 g. of polypropylene triol (MW 255) and 135 g. of xylene is reacted with a mixture of 77 g. of bis(2-isocyanatoethyl)-4-cyclohexene-1,2-dicarboxylate and 43.5 g. of toluene-2,4-diisocyanate. The resulting hydroxyl-terminated polyurethane is then reacted with 776 g. of chlorendic acid and 320 g. of xylene. After distillation of 39 cc. of water and addition of 250 g. of xylene, a carboxyl-terminated urethane-containing polyester is obtained which has a NV of 60%, a viscosity of about 7.2 stokes, and an acid value of 91.8 (100% solids).

EXAMPLE 13

Following the procedure of Example 4, 92 g. of glycerol in 31.5 g. of xylene and 8.0 g. of methyl isobutyl ketone and containing 0.15 g. of dibutyl tin dilaurate as a catalyst, is reacted with 100 g. of bis(2-isocyanatoethyl)carbonate. The resulting hydroxyl-terminated polyurethane is then reacted with 1550 g. of chlorendic acid and 82.5 g. of pentaerythritol in 708 g. of xylene. After distillation of 80 cc. of water, cooling, and addition of 415 g. of xylene, a carboxyl-terminated urethane-containing polyester is obtained having a NV of 60%, a viscosity of about 4.4 stokes, and an acid value of 98.5 (100% solids).

EXAMPLE 14

A mixture of 268 g. of trimethylol propane and 160 g. of pelargonic acid is esterified until the acid value is less than 3. To the resulting mixture is added 251 g. of xylene and then 174 g. of toluene-2,4-diisocyanate, dropwise, at 190°–200° F. The mixture is reacted according to the procedure of Example 4. The resulting hydroxyl-terminated ester-containing polyurethane is then reacted with 776 g. of chlorendic acid, 148 g. of phthalic anhydride in 382 g. of xylene. After distillation of 44 cc. of water and addition of 350 g. of xylene, a carboxyl-terminated urethane-containing polyester is obtained having a NV of 60%, a viscosity of U (Gardner-Holdt scale), and an acid value of 77 (100% solids).

EXAMPLE 15

The procedure of Example 14 is repeated employing 138 g. of pentaerythritol instead of the trimethylol propane. The resulting ester is diluted with 158 g. of xylene and reacted with 87 g. of toluene-2,4-diisocyanate. The resulting hydroxyl-terminated ester-containing polyurethane is reacted with 776 g. of chlorendic acid in 315 g. of xylene. A carboxyl-terminated urethane-containing polyester is obtained which, on dilution with 260 g. of xylene, has a NV of 60%, a viscosity of U¾ (Gardner-holdt scale), and an acid value of 79.2 (100% solids).

EXAMPLES 16–21

The coating vehicles described in Table I below are obtained by admixing the components in the indicated amounts (in parts) and stirring until homogeneous. The coating vehicles are then evaluated by drawing down 1.5 mil films on glass and allowing such to air dry (50% relative humidity, 77° F.), and by drawing down 3 mil films and baking such at 250° F. for thirty minutes. The properties measured and the results obtained are set forth in Table I and compared to a control derived from a commercial composition. Additionally, the shelf life of the mixed components are measured by measuring the time from mixing to the time that the viscosity of the blend is too high to be useful in coating applications. The non-transfer time is the time in which a film has hardened sufficiently to prevent transfer of the resin to a bare surface by touching lightly with the finger. The xylene resistance test and the NaOH resistance test are performed employing 6 drops of xylene and, respectively, 6 drops of NaOH on the coating film under a watch glass for 15 minutes and examining the film as to the effect. The air-dried films are allowed to cure for one week before applying the test. In baked films, the test is applied after two hours on removal from the oven. The films are evaluated on a scale of 0–10 in which 0 indicates severe degradation or solution of the film and 10 indicates no effect on the film. The Zapon test, the Sward test, and the G.E. Impact test are well-known and require no further description.

The improvement in shelf life of the coating compositions employing the novel carboxyl-terminated urethane-containing polyesters in combination with the retention of fast air-drying times is a particularly significant improvement of the coating compositions illustrated.

the overall ratio of carboxylic acid groups to hydroxyl groups being from 1.2 to 3.0; and (4) continuing the reaction until substantially all of the hydroxyl groups have reacted, and recovering a carboxyl-terminated urethane-containing polyester having an acid value of at least 50.

2. The carboxyl-terminated urethane-containing polyester of claim 1 wherein the polyisocyanate has from 2 to 4 isocyanate groups; the polyol has a molecular weight of 60 to 1,000 and contains on the average of 2.2 to 4.0 hydroxyl groups per molecule; the ratio of —OH to

TABLE I

| Examples | 16 | 17 | 18 | 19 | 20 | 21 | Control |
|---|---|---|---|---|---|---|---|
| Components: | | | | | | | |
| Polyester of— | | | | | | | |
| Example 2 | 36 | | | | | | |
| Example 4 | | 36 | | | | | |
| Example 5 | | | 36 | | | | |
| Example 8 | | | | 30 | | | |
| Example 15 | | | | | 36 | | |
| Example 11 | | | | | | 36 | |
| Component 202 [1] | | | | | | | 30 |
| Component 303 [2] NV 90% | 16 | 16 | 16 | 20 | 16 | | 20 |
| Component 303 and DER 736 [3] 80/20; NV 90% | | | | | | 16 | |
| Xylene | 8 | 8 | 8 | 10 | 8 | 8 | 10 |
| Shelf life of blend, hrs | >48 | >48 | >48 | ([4]) | ~40 | ([5]) | 24 |
| Properties: | | | | | | | |
| Air Dry Film: | | | | | | | |
| Non-transfer time, min | 10 | 10 | 10 | 20 | 15 | 15 | 15 |
| Pass 500 g. Zapon test, hrs | 4 | 4.5 | 4.5 | ~8 | 6 | ~7 | 6.5 |
| 24-hour Sward Hardness test | 32 | 36 | 36 | 24 | 38 | 30 | 32 |
| Xylene resistance | 7 | 5 | 8 | | 1 | | 7 |
| NaOH resistance | | 9 | 1 | 6 | 9 | | 9 |
| Baked Film: | | | | | | | |
| Sward Hardness | 54 | 60 | 60 | 62 | | | 52 |
| G.E. impact on tin | 60 | 60 | 60 | 60 | | | 60 |
| Mar resistance | ([6]) | ([6]) | ([6]) | ([7]) | | | ([6]) |
| Xylene resistance | 9 | 9 | 9 | 5 | | | 7 |
| NaOH resistance | 10 | 10 | 10 | 10 | | | 10 |

[1] Carboxyl-terminated polyester component of commercially available "Aroflint" 505.
[2] Epoxidized vegetable oil comprising principally soybean oil having an oxirane value of 7.7%—epoxy component of commercially available "Aroflint" 505.
[3] Commercially available polyglycol type epoxy resin (eq. wt. 175–205).
[4] 5 days.
[5] Greater than 5 days.
[6] Very good.
[7] Good+.

From the foregoing description and examples, it should be clear that the carboxyl-terminated urethane-containing polyesters of the present invention can be used to cure a variety of epoxidized components. By varying the amounts and types of the various reactants, it is possible to obtain a wide variety of film properties. For example, coatings ranging from soft, flexible primers, to hard, mar-resistant finishes, can be obtained. These epoxy/polyester systems can be used to form free films, as caulking compounds, casting resins, laminating resins, adhesives, etc. If desired, the novel polyesters can be blended with other compatible epoxy curing agents (e.g. the curing agents of U.S. 3,218,274).

Although the present invention has been described with a certain degree of particularity, it will be realized that numerous modifications and variations, as well as uses (e.g. as sealants, etc.) falling within the spirit and scope of this invention, will become obvious to one routinely engaged in this art.

What is claimed is:

1. A carboxyl-terminated urethane-containing polyester obtained by:
   (1) reacting under urethane-forming conditions a polyisocyanate containing two or more isocyanate groups with a polyol containing on the average more than two hydroxyl groups, the overall ratio of —OH to —NCO being from 1.2 to 3.0;
   (2) continuing the reaction until substantially all of the isocyanate groups have reacted with the polyol and a hydroxyl-terminated polyurethane is obtained;
   (3) reacting under ester-forming conditions the hydroxyl-terminated polyurethane with a polycarboxylic acid containing at least two carboxylic acid groups, —NCO is 1.5 to 2.2; and the ratio of carboxylic acid groups to hydroxyl groups is from 1.5 to 2.2.

3. The carboxyl-terminated urethane-containing polyester of claim 2 wherein the polyol is an aliphatic polyol or a polyoxyalkylene polyol.

4. The carboxyl-terminated urethane-containing polyester of claim 2 wherein the polycarboxylic acid is at least in part a chlorinated polycarboxylic acid.

5. The carboxyl-terminated urethane-containing polyester of claim 4 wherein the isocyanate is an aliphatic diisocyanate.

6. The carboxyl-terminated urethane-containing polyester of claim 5 wherein the chlorinated polycarboxylic acid is chlorendic acid or chlorendic anhydride.

7. The carboxyl-terminated urethane-containing polyester of claim 5 wherein the polycarboxylic acid comprises from 25 to 75 mole percent of chlorendic acid or anhydride, the remainder being an aromatic dicarboxylic acid.

8. A coating vehicle capable of forming tack-free films at room temperature in the absence of supplemental catalysts and curing agents, said system consisting essentially of solvent and;
   (a) an epoxy component consisting of at least 80% by weight of epoxidized fatty acid esters of a polyhydric alcohol having at least three hydroxyl groups before esterification; said epoxidized fatty acid ester having 8–26 carbon atoms in its fatty radicals and an internal oxirane value of 3% to 10%; and
   (b) the carboxyl-terminated urethane-containing polyester of claim 1, from 50–250 parts by weight of polyester being present per 100 parts by weight of epoxy component.

9. The coating vehicle of claim 8 wherein:
(a) said epoxidized fatty acid ester is a mixture of epoxidized linseed oil and epoxidized soybean oil having an average oxirane value of at least 5.5%; and
(b) the carboxyl-terminated urethane-containing polyester is the polyester of claim 4.

10. The coating vehicle of claim 8 wherein:
(a) the epoxy component has an internal oxirane value of at least 5.5% and is the epoxidized full ester of tall oil fatty acids and dipentaerythritol; and
(b) the carboxyl-terminated urethane-containing polyester is the polyester of claim 7.

References Cited

UNITED STATES PATENTS

| | | | |
|---|---|---|---|
| 3,278,636 | 10/1966 | Wynstra | 260—835 |
| 3,218,274 | 11/1965 | Boller | 260—75 X |
| 2,683,131 | 7/1954 | Cass | 260—835 |

DONALD E. CZAJA, *Primary Examiner.*

C. WARREN IVY, *Assistant Examiner.*

U.S. Cl. X.R.

260—75, 31.2, 78.4, 32.8, 835, 33.6, 830, 33.8, 836, 33.2, 22, 47